US009196145B2

(12) United States Patent
Guatteri et al.

(10) Patent No.: US 9,196,145 B2
(45) Date of Patent: Nov. 24, 2015

(54) METHOD AND SYSTEM FOR AUTOMATED LOCATION DEPENDENT NATURAL DISASTER FORECAST

(75) Inventors: Maria Giovanna Guatteri, New York, NY (US); Nikhil Da Victoria Lobo, New York, NY (US)

(73) Assignee: SWISS REINSURANCE COMPANY LTD., Zurich (CH)

( * ) Notice: Subject to any disclaimer, the term of this patent is extended or adjusted under 35 U.S.C. 154(b) by 723 days.

(21) Appl. No.: 13/522,583

(22) PCT Filed: Jan. 19, 2010

(86) PCT No.: PCT/EP2010/050595

§ 371 (c)(1), (2), (4) Date: Oct. 19, 2012

(87) PCT Pub. No.: WO2011/088891

PCT Pub. Date: Jul. 28, 2011

(65) Prior Publication Data

US 2013/0035859 A1 Feb. 7, 2013

(51) Int. Cl.

*G01W 1/10* (2006.01)
*G08B 21/10* (2006.01)
*G08B 31/00* (2006.01)

(52) U.S. Cl.

CPC ................ *G08B 21/10* (2013.01); *G08B 31/00* (2013.01)

(58) Field of Classification Search

USPC .............................................................. 702/3
See application file for complete search history.

(56) References Cited

U.S. PATENT DOCUMENTS

| | | | |
|---|---|---|---|
| 6,169,476 | B1 | 1/2001 | Flanagan |
| 2007/0143019 | A1 | 6/2007 | Feyen et al. |
| 2009/0177500 | A1 | 7/2009 | Swahn |

FOREIGN PATENT DOCUMENTS

| | | |
|---|---|---|
| WO | 2006 002566 | 1/2006 |

OTHER PUBLICATIONS

S.W. Myint, Categorizing natural disaster damage assessment using satellite-based geospatial techniques, Published: Jul. 17, 2008, p. 707-719.*

Duzgun, H. S. B., "A Quantitative Risk Assessment Framework for Rock Slides," ARMA, vol. 8, No. 279, Total 9 pages, (Jun. 29, 2008) XP-002603456.

International Search Report Issued Oct. 20, 2010 in PCT/EP10/50595 Filed Jan. 19, 2010.

* cited by examiner

*Primary Examiner* — Tung S Lau
(74) *Attorney, Agent, or Firm* — Oblon, McClelland, Maier & Neustadt, L.L.P.

(57) ABSTRACT

A forecast system and method for automated location dependent natural disaster impact forecasts includes located gauging stations to measure natural disaster events. Location dependent measurement parameters for specific geotectonic, topographic or meteorological conditions associated with the natural disaster are determined and critical values of the measurement parameters are triggered to generate a dedicated event signal for forecasted impacts of the disaster event within an area of interest. In particular, the signal generation is based upon the affected population or object within the area of interest.

15 Claims, 5 Drawing Sheets

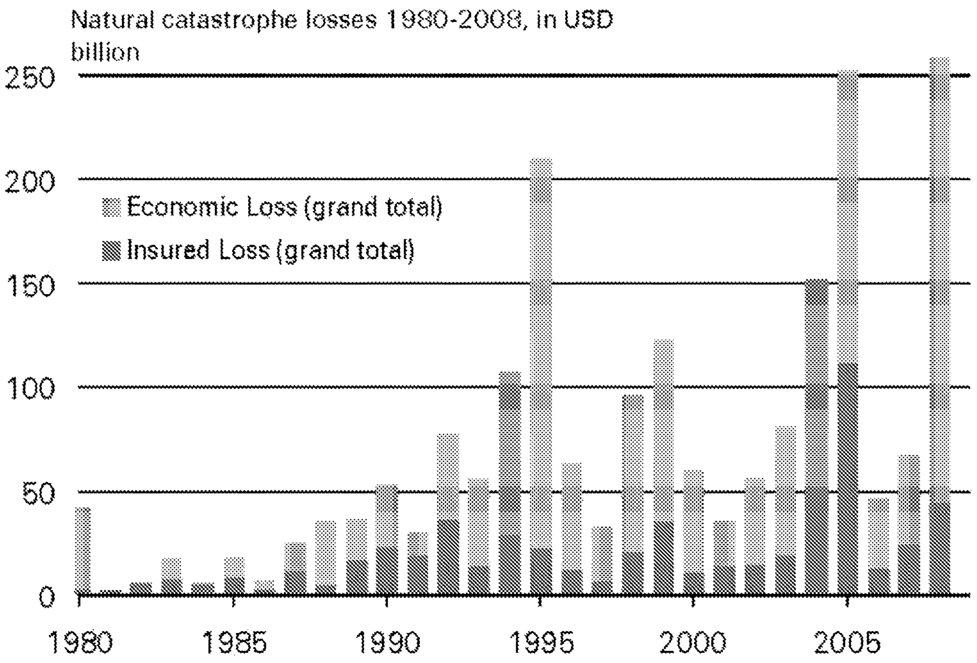

Fig. 2

| Country | Reference event | Return period in years, approx. | Economic loss in USDbn | Economic loss in % of GDP | of which, not insured |
|---|---|---|---|---|---|
| Japan | earthquake | 200 | 500 | 11.5% | 90-95% |
| US | California earthquake | 200 | 300 | 2.3% | 80-90% |
| US | hurricane | 200 | 300 | 2.3% | 40-60% |
| Japan | typhoon | 200 | 50 | 1.1% | 60-80% |
| Italy | earthquake | 500 | 50 | 2.7% | 70-80% |
| Turkey | earthquake | 500 | 50 | 12.8% | 70-80% |
| Mexico | earthquake | 500 | 50 | 5.9% | 80-90% |
| Portugal | earthquake | 1000 | 50 | 25.9% | 80-90% |
| UK | windstorm | 200 | 30 | 1.3% | 10-30% |
| Canada | earthquake in BC | 500 | 20 | 1.6% | 30-50% |
| Israel | earthquake | 1000 | 20 | 14.4% | 30-50% |
| Australia | earthquake in Sydney | 1000 | 20 | 2.7% | 30-50% |
| France | windstorm | 200 | 15 | 0.7% | 10-30% |
| Germany | windstorm | 200 | 15 | 0.5% | 40-60% |

Fig. 3

Earthquake Footprint (MMI)

Selected City Exposure

| MMI | City | Population |
|---|---|---|
| VII | Tianpeng | 60k |
| VII | Jiangyou | 127k |
| VII | Mianyang | 264k |
| VI | Chengdu | 3950k |
| VI | Guangyuan | 213k |
| VI | Linqiong | 55k |
| VI | Deyang | 152k |
| V | Nanchong | 7150k |
| V | Zigong | 689k |
| V | Neijiang | 546k |
| V | Chongqing | 3967k |

Wind Footprint from Hurricane Ike
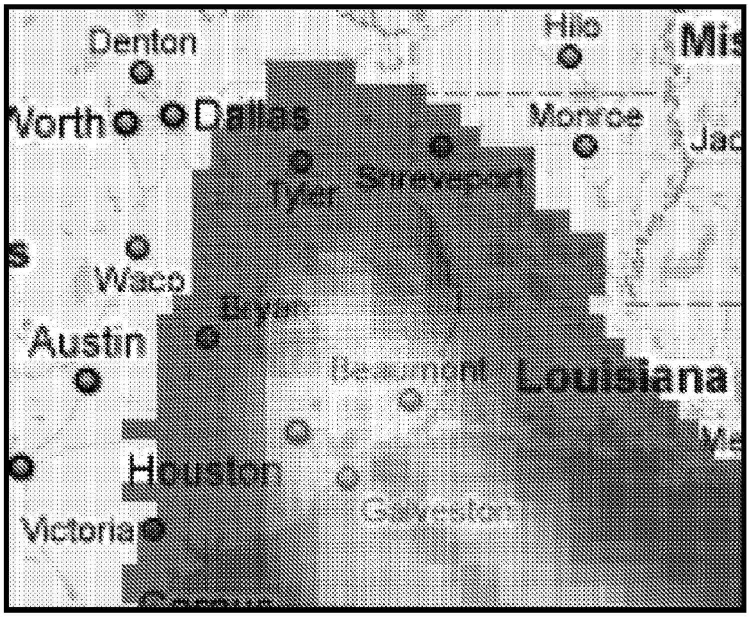
Population Density
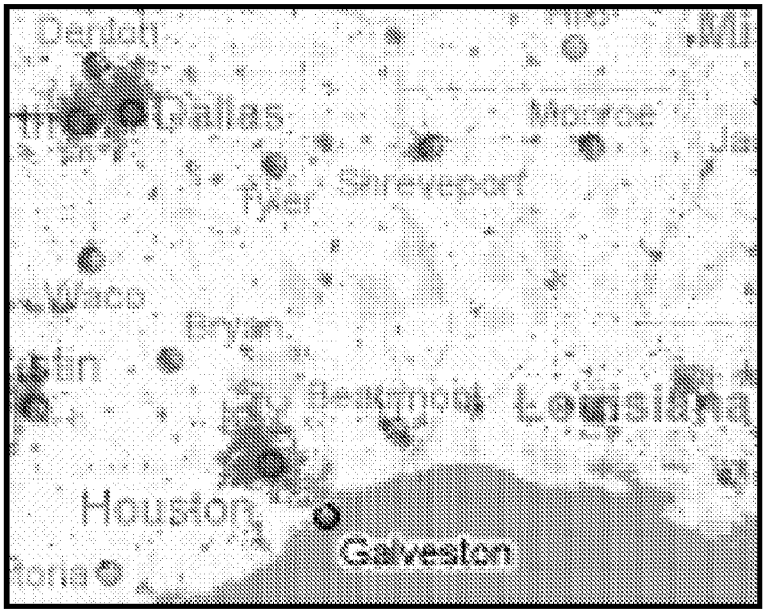
Fig. 5

Satellite Image of Flood Footprint
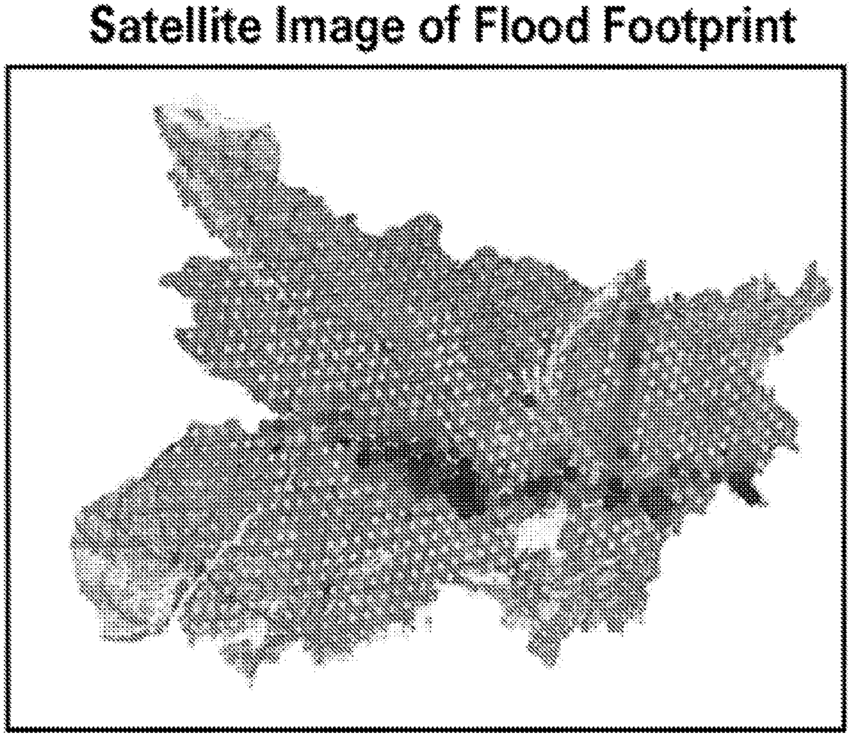
Population Density
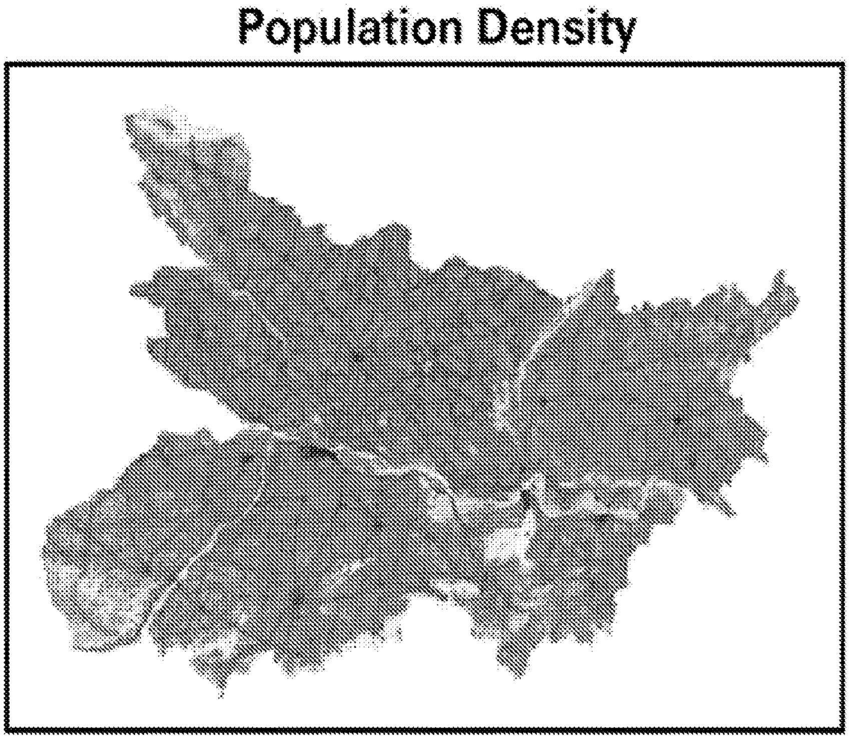
Fig. 6

METHOD AND SYSTEM FOR AUTOMATED LOCATION DEPENDENT NATURAL DISASTER FORECAST

FIELD OF THE INVENTION

This invention relates to a method and system for automated location dependent natural disaster and disaster impact forecast, whereas natural disaster events are measured by located gauging stations, location dependent measurement parameters for specific geotectonic, topographic or meteorological conditions associated with the natural disaster are determined and critical values of the measurement parameters are triggered to generate a dedicated event signal for specific disaster conditions associated with the disaster event or for forecasted impacts of the disaster event within an area of interest. In particular, the invention relates all kind of tropical cyclones, earthquake, inundation, volcanic eruptions, and seismic sea waves. Furthermore the dedicated event signal specifically generated for all kind of automated alarm systems and damage protection systems as e.g. the insurance and reinsurance industry.

BACKGROUND OF THE INVENTION

Each year, natural disasters (also referred to as tropical cyclones (e.g. hurricanes, typhoons, tropical storms), earthquake, inundation, volcanic eruptions, and seismic sea waves etc.) cause severe damage in various parts of the world. The occurrence of most of such disaster events is difficult, if not impossible, to predict over the long term. Even the exact position of an excursion point for temporally close events (or the exact track of moving events as e.g. occurring cyclones) are mostly difficult to predict over a period of hours or days. In 2008, natural catastrophes claimed 234 800 human lives worldwide and caused total losses of approximately USD 259 bn. However, only a fraction of total losses caused by natural catastrophes is covered by insurance (USD 44.7 bn in 2008), since for many large loss potentials the un-insured portion is significant—even in developed insurance markets. Much of the funding shortfall is absorbed by the public sector, including (i) Paying for emergency expenses (shelter, emergency services, critical supplies etc.), (ii) Paying for reconstruction for critical assets/infrastructure, (iii) Offering tax incentives to restart the economy. However, these critical actions raise deficits and a dilemma for governments: how should these emergency costs be financed? Possibilities are through budget resources, taking away from other needs, through internal fiscal measures (i.e., higher taxes), through external fiscal measures (i.e., new municipal debt). It is obvious, that for natural disaster events with huge impact all these measures come along with new problems.

Therefore, due to this massive gap between economic and insured losses, there is a great need for new risk transfer solutions. Using parametric risk transfer systems, this could provide a solution for the problem. Parametric insurance uses transparent triggers to deliver large non-reimbursable funds to the buyer. The advantages are that the speedy delivery of funds provide liquidity and capital, the fixed premium allows for budgeting certainty, the contracts may be multi-year, aiding legislative process, and unlike debt have no payback and no negative impact on credit. It is also important, that parametric covers can be tailor-made to the needs of the state government.

In particular, the given examples in this document address specifically tropical cyclones and earthquakes, since these types of natural disasters create the biggest damage to humans and properties each year. Hurricanes is the most severe category of the meteorological phenomenon known as the "tropical cyclone." Hurricanes, as all tropical cyclones, include a pre-existing weather disturbance, warm tropical oceans, moisture, and relatively light winds aloft. If the right conditions persist long enough, they can combine to produce the violent winds, incredible waves, torrential rains, and floods we associate with this phenomenon. So, the formation of a tropical cyclone and its growth into e.g. a hurricane requires: 1) a pre-existing weather disturbance; 2) ocean temperatures at least 26° C. to a depth of about 45 m; and 3) winds that are relatively light throughout the depth of the atmosphere (low wind shear). Typically, tropical storms and hurricanes weaken when their sources of heat and moisture are cut off (such as happens when they move over land) or when they encounter strong wind shear. However, a weakening hurricane can reintensify if it moves into a more favorable region. The remnants of a land falling hurricane can still cause considerable damage. Each year, an average of ten tropical storms develop over the Atlantic Ocean, Caribbean Sea, and Gulf of Mexico. Many of these remain over the ocean. Six of these storms become hurricanes each year. In an average 3-year period, roughly five hurricanes strike e.g. the United States coastline, killing approximately 50 to 100 people anywhere from Texas to Maine. Of these, two are typically major hurricanes (winds greater than 110 mph). The intensity of tropical cyclones are typically relative terms, because lower category storms can sometimes inflict greater damage than higher category storms, depending on where they strike, what other weather features they interact with, the particular hazards they bring, and how slowly they move. In fact, tropical storms can also produce significant damage and loss of life, mainly due to flooding. Normally, when the winds from these storms reach 34 kt, the cyclone is given a name. In the state of the art, different systems can be found to forecast tropical cyclone winds. One possibility is shown by M. Demaria in "Estimating Probabilities of Tropical Cyclone Surface Winds" (X-002297474 EPO) or by M. Demaria and J. Kaplan in An Updated Statistical Hurricane Intensity Prediction Scheme (SHIPS) for Atlantic and Eastern North Pacific Basins" (XP-008035846). Both systems describe Monte Carlo generation of cyclone paths and intensities resulting in probabilities of occurrence of a specific wind strength for a given location and time.

Similar to cyclone forecast systems, earthquake forecast systems or earthquake impact forecast systems should be systems capable of generating prediction that an earthquake of a specific magnitude will occur in a particular place at a particular time (or ranges thereof) and which damage it will cause to what kind of objects, respectively. An earthquake is the vibration of the earth's surface (including the ocean bottom) that follows a sudden release of seismic strain energy within the earth's crust that has built up over time. This release of strain energy is typically generated by the displacement of large rock masses along a fracture within the earth ("fault"). For a bigger earthquake, there is a greater amount of energy release and hence a larger rupture of the fault. The ground shaking at a particular site depends on the size of the earthquake, the distance from the source of the earthquake and the local soil conditions at the site. Earthquakes can result in extensive loss of life, shaking damage to buildings and their contents, interruption of business, landslides, liquefaction and ignition of large fires. MMI Intensity Measure is a twelve-degree scale that describes in general terms the effects of an earthquake at a specific location. The lower degrees of the scale generally deal with the manner in which the earthquake is felt by people. The higher degrees of the scale are based on observed structural damage and ground failure. For purposes of this transaction, only MMI degree VII and larger are used, which can be generally described as very strong (VII), destructive (VIII), ruinous (IX), disastrous (X), very disastrous (XI) and catastrophic (XII). For purposes of this transaction, MMI is calculated from Spectral Acceleration and PGV using published empirical relationships.

Despite all improvements the last years in the state of the art systems, scientifically reproducible predictions are difficult to make and cannot yet be made to a specific hour, day, or month. Only for well-understood geological faults, seismic hazard assessment maps can estimate the probability that an earthquake of a given size will affect a given location over a certain number of years and what kind of damage it can cause to different structured objects at that location. Once an earthquake has already begun, there are early warning devices in the state of the art which can provide a few seconds' warning before major shaking arrives at a given location. This technology takes advantage of the different speeds of propagation of the various types of vibrations produced. Aftershocks are also likely after a major quake, and are commonly planned for in earthquake disaster response protocols. Therefore, experts do advise general earthquake preparedness, especially in areas known to experience frequent or large quakes, to prevent injury, death, and property damage if a quake occurs with or without warning. It is necessary to predict the impact of an occurring earthquake or a possible earthquake to the objects placed at the location or humans, living in the region. In case of occurring earthquakes, alarm systems and damage repair systems need to be activated and controlled by means of appropriate signal transmission. In case of possible earthquake, the forecast is needed to have a proper preparedness. In the state of the art, the systems use so called earthquake impact (or damage) index to quantitatively approximate the impact or damage caused by an earthquake to pre-defined populations or objects associated with different geographical locations, e.g. damages relating to buildings, bridges, highways, power lines, communication lines, manufacturing plants or power plants, and even non-physical values, e.g. business interruption, contingent business interruption values or exposed population, based solely on physically measured and publicly available parameters of the earthquake phenomenon itself. The impact parameters as a part of the signal generation of the forecast system can then be used to electronically generate appropriate alarm or activation signals, which can be transmitted to correlated modules and alarm devices. As further example may serve the patent documents JP60014316, GR1003604, GR96100433, CN1547044, JP2008165327, JP2008077299, US 2009/0164256 or US 2009/0177500. Nevertheless, in the state of the art, efficient earthquake damage prediction and prevention systems are technically difficult to realize. They can comprise e.g. earthquake detection units or method together with units to generate propagation values of the earthquake's hypocenter or epicenter. Even within an epicenter region it is often difficult to properly weigh the local impact and impact values, respectively, due to different geological formations, gating of the affected object to the ground and internal structure and assembly of the affected object. However, quickly knowing the impact of the earthquake to affected objects within a region can be important to generate and transmit correct activation signals or alarm signals to e.g. automated emergency devices or damage intervention devices or systems and/or general operating malfunction intervention devices, as for instance, monitoring devices, alarm devices or systems for direct technical intervention at the affected object. Furthermore, earthquake damage prediction and prevention systems of the state of the art are not very reliable and often to slow. One of the problems of the state of the art is, that the signals of the systems can hardly be correctly weighed, due to the law of large numbers i.e. of low statistic in the field of earthquakes in connection with a specific geological formation. Finally, those systems of the state of the art are expensive to realize and extremely costly in terms of labor.

Technical Object

It is an object of this invention to provide a new and better natural disaster forecast system and method, which does not have the above-mentioned disadvantages of the prior art. In particular, it is an object of the present invention to provide natural disaster forecast and impact forecast for predicting the occurrence and impact to human and objects associated with different geographical locations by a natural disaster. Further it is an object, to generate reliable natural disaster forecast and impact signals, which can easily be weighed. The generation of the appropriate signals or values should be time correct well in advance of an occurring natural disaster or triggered by the occurrence of a natural disaster. In the ideal case, the system should be self-adapting during operation. The impact values or signal should be indicative of the impact caused by a natural disaster to a certain population or object associated with different geographical locations. In particular, it is an object of the present invention to provide a natural disaster forecast system for generating impact signals with consideration of the geographical distribution of the population or objects.

SUMMARY OF THE INVENTION

In particular, these aims are achieved by the invention in which by means of a forecast system natural disaster events are measured by located gauging stations, location dependent values for specific geotectonic, topographic or meteorological conditions associated with the natural disaster are determined and critical values are triggered to generate a dedicated event signal for forecasted impacts of the disaster event within an area of interest, in that historical disaster events are collected by the forecast system and spatio-temporal patterns representative of the occurrence of said historical natural disaster events are generated and saved on a memory module of a calculation unit, said spatio-temporal patterns comprising a plurality of points representative of geographical positions and/or intensity of the event within the area of interest, in that for a geographical area of interest geotectonic, topographic or meteorological condition data are determined based upon said spatio-temporal patterns by means of the calculation unit, said condition data giving the propagation of a natural disaster event dependent of the distance from a specific excursion point or track dependent on the geotectonic, topographic or meteorological structure along a specific propagation line, in that an occurrence of a natural disaster within the area of interest is detected by located gauging stations measuring event parameters of an excursion point or track of said disaster event, and transmitting the event parameters to the forecast system, in which a footprint record is generated based on the transmitted event parameters and condition data, said footprint record comprising the propagation of the event across the area of interest, whereas a grid over the geographical area of interest is established by means of the calculation unit, a magnitude value of the detected natural disaster event is generated based on the footprint record for each grid cell, in which for each grid cell a population of a specific population is determined by the system, and curve factors of a vulnerability curvature are generated by means of an interpolation module based on said population, said vulnerability curvature setting the affected population in relation to a magnitude of a natural disaster event, in which by means of the footprint record and generated vulnerability curvature an affected population value is generated for each grid cell and assigned to a lookup table, giving the affected population by the natural disaster event, and in which by means of a trigger module, an signal impulse is generated, if at least one of the affected population factors of the lookup table within a grid cell is triggered by means of a trigger module to be higher than a definable threshold value, said signal impulse is transmitted as control signal to one or more alarm systems by the natural disaster forecast system. As an embodiment variant, a total affected population signal is generated by means of the trigger module, said total affected population signal comprising the cumulated, affected population factors and the trigger modules triggers on the cumulated total affected population signal.

In an other embodiment of the invention, a plurality of new spatio-temporal patterns representative of the occurrence of natural disaster events are generated for each historical event by means of a first MonteCarlo-module, wherein points of said new spatio-temporal patterns are generated from said points from the excursion center or along the historical track by a dependent sampling process and whereas said geotectonic, topographic or meteorological condition data are determined based upon said spatio-temporal patterns and said new spatio-temporal patterns by means of the calculation unit. Said dependent sampling process can e.g. be a directed random walk process. In an embodiment variant, at least some of the plurality of new natural disaster events can e.g. have starting points that differ from a starting point of the historical natural disaster events upon which the generation of said new natural disaster events are based.

In a further embodiment of the invention, for said spatio-temporal pattern one or more footprint records are generated by means of a second MonteCarlo-module, wherein the new footprint records are generated by a MonteCarlo sampling process and whereas the magnitude value of the detected natural disaster event is generated based on the footprint record and the new footprint records.

In an embodiment, a disaster intensity distribution or an intensity climatology is generated for each of selected cells in the grid, based upon which the magnitude value of the detected natural disaster event is generated for each or selected grid cells by means of the footprint record of the disaster event.

In an other embodiment, a distribution is generated for a definable time period of the spatio-temporal patterns of the historical natural disaster events by means of a scaling table classifying the disaster events by intensity and/or year of occurrence, and said distribution of said historical natural disaster events are reproduced by a filtering module within the new spatio-temporal patterns according to their assigned year, whereas a subset of the new spatio-temporal patterns is selected based on geotectonic, topographic or meteorological condition data by their likeliness of occurrence.

In a further embodiment, the footprint record of each measured event parameters is generated based on a definable natural disaster event profile, and a probability is assigned by a interpolation-module to each point in said grid, giving the probability of the occurrence of a specific intensity at a given geographical location and time.

In an embodiment, the collected historical natural disaster events are filtered by a filter module of the forecast system according to the type of natural disaster event and the signal impulse is generated based upon a selected type of natural disaster event. The selectable types of natural disaster events can e.g. comprise earthquake, inundation, tropical cyclones, volcanic eruptions, and seismic sea waves.

In an other embodiment, the footprint records representative of the intensity of the disaster event comprises atmospheric or seismic or topographic data associated with at least some of the collected historical natural disaster events, said atmospheric or seismic or topographic data defining an historical footprint record of the historical natural disaster event.

In a further embodiment, the magnitude value for a selected cell in the grid is established from at least one of the footprint record data associated with the selected cell and the footprint record data associated with one or more cells adjacent the selected cell. The magnitude value for a selected cell can e.g. be established from a weighted averaging of footprint record data associated with the selected cell and footprint record data associated with one or more cells adjacent a selected cell.

It should be pointed out that, besides the method according to the invention, the present invention also relates to a forecast system and a computer program product for carrying out this method.

According to the present invention, these objects are achieved particularly through the features of the independent claims. Additional features and advantages will become apparent to those skilled in the art upon consideration of the following detailed description of illustrative embodiments exemplifying the best mode of carrying out the method as presently perceived.

The present disclosure will be described hereafter with reference to the attached drawings, which are given as non-limiting examples only, in which:

FIG. 2 is a chart, which shows the natural catastrophe losses from 1980 to 2008.

FIG. 3 is a table, which illustrates the economic loss of the last significant natural disaster events.

FIG. 5 is a chart, which further shows the Windspeed Landfall Footprint from Hurricane Ike and the corresponding population distribution within the footprint, as used by the forecast system and method.

FIG. 6 is a chart, which shows a Flood Footprint in relation to the population density, as used by the forecast system and method.

Figure 1:
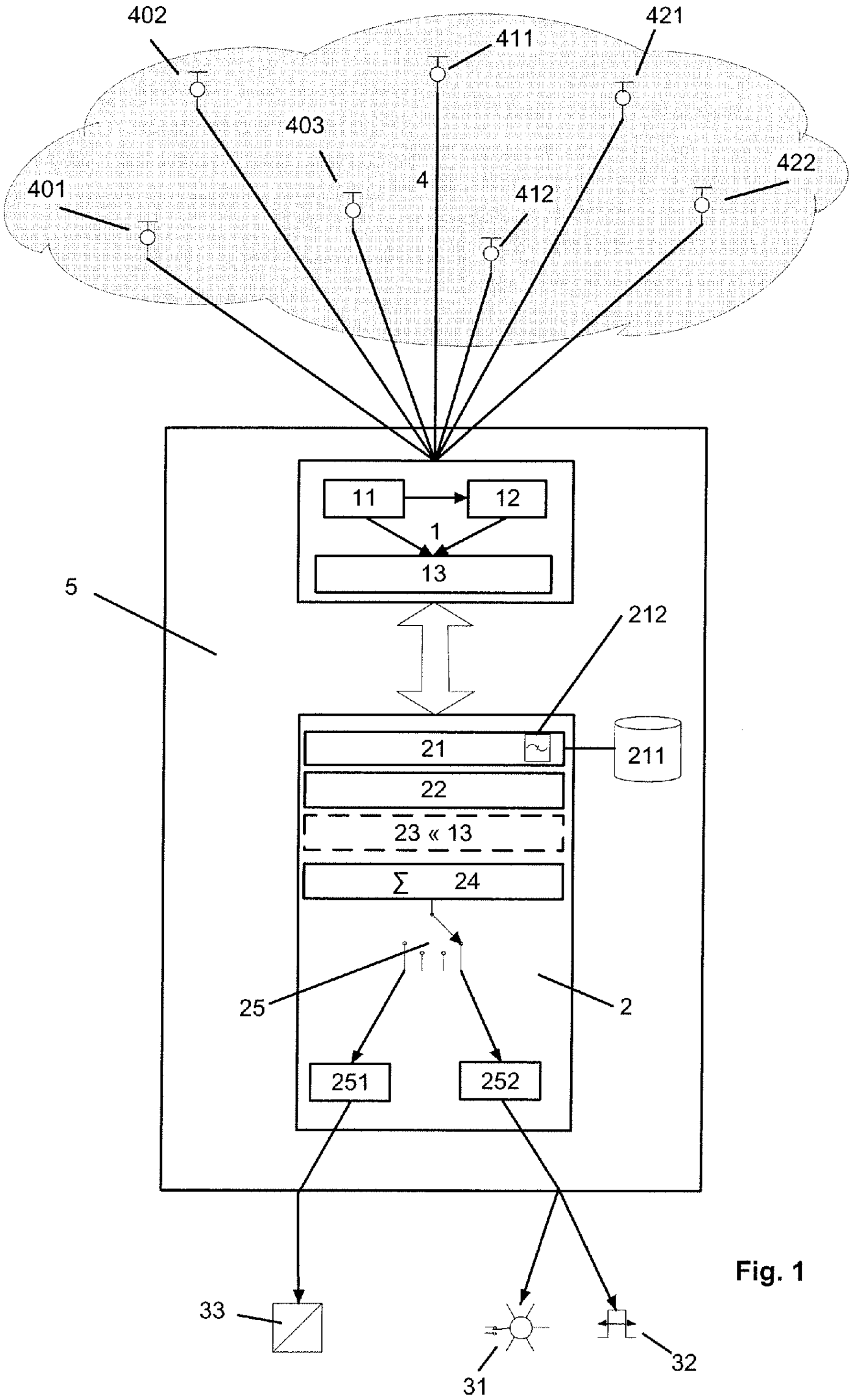
FIG. 1 is a schematic diagram, which illustrates the overall operation of one embodiment of the method of the present invention.

FIG. 1 is an schematic overview, which illustrates the overall operation of one embodiment of the subject method of the present invention. The forecast system 5 for automated location dependent natural disaster forecast and disaster impact forecast measures natural disaster events by means of located gauging stations 401, . . . , 422 measuring location dependent measurement parameters for specific geotectonic, topographic or meteorological conditions associated with the natural disaster. As described below, the forecast system 5 triggers on critical values of the measurement parameters to generate 31,32 a dedicated event signal for forecasted disaster events and impacts of the disaster event within an area of interest 4. The natural disaster forecast system 5 comprises an affected population trigger by means of which can be triggered and/or forecasted, how populations are impacted by an natural disaster within a specific area of interest. At reference numeral 11, the coverage area is broken into a grid by means of the forecast system 5 and at reference numeral 12 the population in each grid cell is determined by means of the calculation unit. The grid cells can be determined dynamically or static defined in the forecast system 5 based for example on geotectonic, topographic or meteorological conditions of specific measurement parameters of located gauging stations 401, . . . , 422. The population density can be achieved by the forecast system 5 using for example census data or other appropriate accessible data sources. At reference numeral 13, a vulnerability curve is generated by means of the forecast system 5 that equates a certain magnitude of event with a percentage of the population affected. The technical approach can be linearly realized in the forecast system 5, so that the stronger an event is detected, the higher is the percentage of affected population. Other approaches are possible based on a specific topographic or demographic or geologic etc. structure of a grid cell. If a natural disaster event is detected by the forecast system 5 a footprint of the event is created at reference numeral 21 representing the magnitude of the event across the coverage area.

At reference numeral 22, the footprint is used to identify what the specific magnitude of the event in each grid cell was. To arrive at the footprint of the disaster event or the forthcoming disaster event, historical disaster events are collected by the forecast system 5 and spatio-temporal patterns representative of the occurrence of said historical natural disaster events are generated and saved on a memory module of a calculation unit. Said spatio-temporal patterns comprise a plurality of points representative of geographical positions and/or intensity of the event within the area of interest. For a geographical area of interest geotectonic, topographic or meteorological condition data are determined based upon said spatio-temporal patterns by means of the calculation unit. Said condition data giving the propagation of a natural disaster event dependent of the distance from a specific excursion point or track dependent on the geotectonic, topographic or meteorological structure along a specific propagation line.

An occurrence or the forthcoming of an occurrence of a natural disaster within the area of interest is detected by the located gauging stations 401, . . . , 422 of the forecast system 5 measuring event parameters of an excursion point or track of said disaster event, and transmitting the event parameters back to the forecast system 5. A footprint record is generated 21 based on the transmitted event parameters and condition data, said footprint record comprising the propagation of the event across the area of interest 4, whereas a grid over the geographical area of interest 4 is established 11 by means of the calculation unit. The forecast system 5 generates a magnitude value of the detected natural disaster event based on the footprint record for each grid cell.

Figure 4:
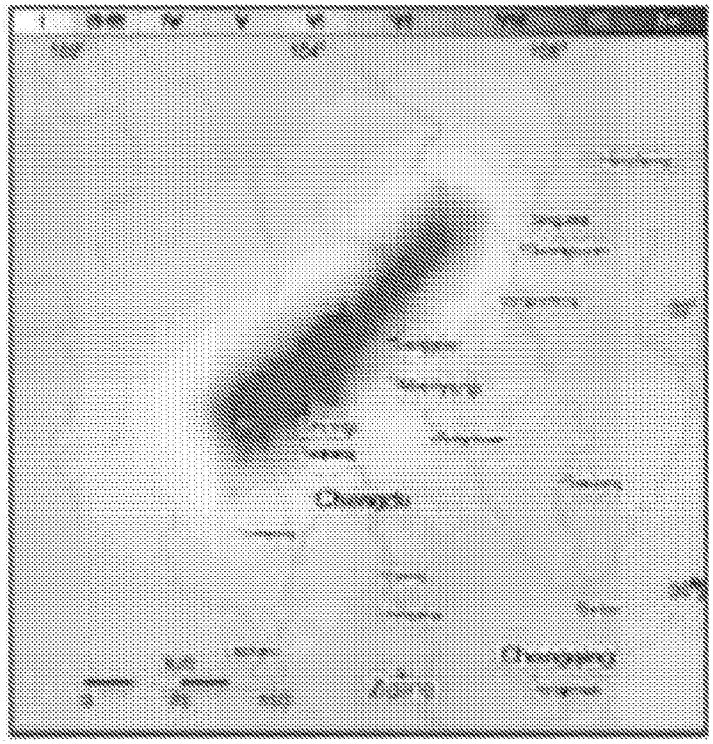
FIG. 4 is a chart, which shows an Earthquake Footprint (MMI), as used by the forecast system and method. Further it shows the exposure of selected cities as given by the natural disaster footprint.

At reference numeral 23, the vulnerability curve from reference numeral 13 and the specific magnitude is used to estimate the population affected in each grid cell. At reference numeral 24, the sum of the population affected in all grid cells is determined. This is referenced as the total affected population by the event. At reference numeral 25 the forecast system is triggering in the values and if the total affected population is greater 252 than the selected starting point, an event signal is generated. The event signal can comprise an activation signal for automated alarm systems or damage recovery systems. This can be a large variety of systems, available in the state of the art, as e.g. automated pumps, sluice, locks or gates, as e.g. water gates. Specific alarm signal devices to dedicatedly activate auxiliary forces or automated devices. It also can comprise activation signals for financially based damage protection or damage covering, as found in the insurance industry, on which signal the coverage of the damage begins paying out. As embodiment variant, the trigger can be realized in a manner, that if the total affected population is greater than the agreed ending point, the insurance pays out completely. Otherwise, no appropriate event signal to activate the insurance is generated. The forecast system 5 comprising the affected population trigger was first developed for earthquake disasters using a vulnerability curve which correlates ground-shaking intensity (Modified Mercalli) with the population affected (FIG. 4). However, the forecast system can be expanded to process tropical cyclones as e.g. hurricane events (FIG. 5), where the vulnerability curve correlates wind speed intensity with population affected and flooding disaster events (FIG. 6), where the vulnerability curve correlates flood depth with the population affected.

As showed in FIG. 1, a natural disaster event is measured by located gauging stations 401, 402, . . . , 422. The gauging stations 401, 402, . . . , 422 can comprise all kind of instruments, measure devices and sensors based on the disaster events to be detected. The gauging stations 401, 402, . . . , 422 can also comprise satellite based pattern recognition e.g. to measure atmospheric pressures or to recognize seismic activities. The forecast system 5 determines location dependent values for specific geotectonic, topographic or meteorological conditions associated with the natural disaster and triggers on critical values to generate a dedicated event signal for forecasted impacts of the disaster event within an area of interest 4.

As mentioned, the forecast system collects historical disaster events and generates spatio-temporal patterns representative of the occurrence of said historical natural disaster events. The collected historical natural disaster events can e.g. be filtered by a filter module of the forecast system according to the type of natural disaster event and the signal impulse is generated based upon a selected type of natural disaster event. The selectable types of natural disaster events can e.g. comprise earthquake, inundation, tropical cyclones, volcanic eruptions, and seismic sea waves. The spatio-temporal patterns are saved on a memory module of a calculation unit 211. A plurality of spatio-temporal patterns representative of an historical track or excursion point of disaster events can be assigned to a year of occurrence of said disaster event and are saved on a memory module of a calculating unit, said data records including a plurality of points representative of geographical positions and/or intensity of the event within the area of interest 4. For a geographical area of interest geotectonic, topographic or meteorological condition data are determined based upon said spatio-temporal patterns by means of the calculation unit, said condition data giving the propagation of a natural disaster event dependent of the distance from a specific excursion point or track dependent on the geotectonic, topographic or meteorological structure along a specific propagation line. The occurrence of a natural disaster within the area of interest is detected by dedicated gauging stations 401, . . . , 423 and event parameters of an excursion point or track of said disaster event are measured by means of the gauging stations 401, 402, 403, 422, 412, 421, 422. The gauging stations 401, 402, 403, 422, 412, 421, 422 can be coupled to the central system 5 by appropriate interfaces, in particular network interfaces for land- or air-based transmission of data. The event parameters can comprise physical measures as temperature, pressure, wind speed etc. A footprint record is generated 21 by the forecast system based on the event parameters and condition data. The footprint record comprises the propagation of the magnitude of the event across the coverage area, whereas a grid over the geographical area of interest is established by means of the calculation unit and a magnitude value of the detected natural disaster event is generated based on the footprint record for each grid cell. The footprint record of each measured event parameters can be generated e.g. based on a definable natural disaster event profile, and a probability is assigned by a interpolation-module to each point in said grid, giving the probability of the occurrence of a specific intensity at a given geographical location and time. The interpolation-module can be realized software and/or hardware based. The magnitude value for a selected cell in the grid can e.g. also be established from at least one of the footprint record data associated with the selected cell and the footprint record data associated with one or more cells adjacent the selected cell.

For each grid cell a population of a specific population type is determined by the forecast system 5, and curve factors of a vulnerability curvature are generated by means of an interpolation module based on said population with a specific grid cell. The vulnerability curvature sets the affected population in relation to a magnitude of a natural disaster event. By means of the footprint record and generated vulnerability curvature an affected population value is generated 23 for each grid cell and assigned to a lookup table, giving the affected population of the natural disaster event. By means of a trigger module, an signal impulse is generated 31/32, if at least one of the affected population factors of the lookup table within a grid cell is triggered by means of a trigger module to be higher 252 than a definable threshold value, said signal impulse is transmitted as control signal to one or more alarm systems 31/32 by the natural disaster forecast system 5. Instead of selected cells, a total affected population signal can be generated 24 by means of the trigger module, said total affected population signal comprising the cumulated, affected population factors and the trigger modules triggers on the cumulated total affected population signal. In connection with alarm systems 31/32, the trigger module can be coupled to a financial transaction process compensating disaster impact damages or buyer of corresponding derivates based on how many citizens are affected. If none of the affected population factors of the lookup table within a grid cell is triggered by means of a trigger module to be higher than a definable threshold value, still said signal impulse can be generated 251 and transmitted as control signal or steering signal by the natural disaster forecast system 5, for example as peer signal, so that the forecast system 5 can be monitored externally on its functionality and technical run up.

As another embodiment variant, additionally, a plurality of new spatio-temporal patterns representative of the occurrence of natural disaster events are generated for each historical event by means of a first MonteCarlo-module, wherein points of said new spatio-temporal patterns are generated from said points from the excursion center or along the historical track by a dependent sampling process and whereas said geotectonic, topographic or meteorological condition data are determined based upon said spatio-temporal patterns and said new spatio-temporal patterns by means of the calculation unit. Further, for said spatio-temporal pattern one or more footprint records can generated by means of a second MonteCarlo-module, wherein the new footprint records are generated by a MonteCarlo sampling process and whereas the magnitude value of the detected natural disaster event is generated based on the footprint record and the new footprint records. By means of the footprint record of the disaster event a disaster intensity distribution or an intensity climatology can be generated for each of the selected cells in the grid, based upon which the magnitude value of the detected natural disaster event is generated for each or selected grid cells. Further, it can be useful that a distribution is generated by the system for a definable time period of the spatio-temporal patterns of the historical natural disaster events by means of a scaling table classifying the disaster events by intensity and/or year of occurrence, and said distribution of said historical natural disaster events are reproduced by a filtering module within the new spatio-temporal patterns according to their assigned year, whereas a subset of the new spatio-temporal patterns is selected based on geotectonic, topographic or meteorological condition data by their likeliness of occurrence. The footprint records representative of the intensity of the natural disaster events can e.g. comprise atmospheric or seismic or topographic data associated with at least some of the collected historical natural disaster events, said atmospheric or seismic or topographic data defining an historical footprint record of the historical natural disaster event.

The invention claimed is:

1. A method for automated location dependent natural disaster forecast and disaster impact forecast by means of a forecast system, natural disaster events being measured by located gauging stations, location dependent measurement parameters for specific geotectonic, topographic or meteorological conditions associated with the natural disaster being determined and critical values of the measurement parameters being triggered to generate a dedicated event signal for forecasted disaster events and impacts of the disaster event within an area of interest, comprising:

collecting historical disaster events by the forecast system and generating and saving spatio-temporal patterns representative of the occurrence of said historical natural disaster events on a memory module of a calculation unit, said spatio-temporal patterns comprising a plurality of points representative of geographical positions and/or intensity of the event within the area of interest, determining for a geographical area of interest geotectonic, topographic or meteorological condition data based upon said spatio-temporal patterns by means of the calculation unit, said condition data giving the propagation of a natural disaster event dependent of the distance from a specific excursion point or track dependent on the geotectonic, topographic or meteorological structure along a specific propagation line, detecting an occurrence or the forthcoming of an occurrence of a natural disaster within the area of interest by located gauging stations measuring event parameters of an excursion point or track of said disaster event, and transmitting the event parameters to the forecast system, generating a footprint record based on the transmitted event parameters and condition data, said footprint record comprising the propagation of the event across the area of interest, a grid over the geographical area of interest being established by means of the calculation unit, a magnitude value of the detected natural disaster event is generated based on the footprint record for each grid cell, determining for each grid cell a population of a specific population by the system, and curve factors of a vulnerability curvature are generated by means of an interpolation module based on said population, said vulnerability curvature setting the affected population in relation to a magnitude of a natural disaster event, generating, by means of the footprint record and generated vulnerability curvature, an affected population value for each grid cell and assigned to a lookup table, giving the affected population by the natural disaster event, and generating, by means of a trigger module, a signal impulse, if at least one of the affected population factors of the lookup table within a grid cell is triggered by means of a trigger module to be higher than a definable threshold value, said signal impulse is transmitted as control signal to one or more alarm systems by the natural disaster forecast system.

2. The method according to claim 1, wherein a total affected population signal is generated by means of the trigger module, said total affected population signal comprising the cumulated, affected population factors and the trigger module triggers on the cumulated total affected population signal.

3. The method according to claim 1, wherein a plurality of new spatio-temporal patterns representative of the occurrence of natural disaster events are generated for each historical event by means of a first MonteCarlo-module, wherein points of said new spatio-temporal patterns are generated from said points from the excursion center or along the historical track by a dependent sampling process and wherein said geotectonic, topographic or meteorological condition data are determined based upon said spatio-temporal patterns and said new spatio-temporal patterns by means of the calculation unit.

4. The method according to claim 1, wherein by means of the footprint record of the disaster event a disaster intensity distribution or an intensity climatology is generated for each of the selected cells in the grid, based upon which the magnitude value of the detected natural disaster event is generated for each or selected grid cells.

5. The method according to claim 1, wherein a distribution is generated for a definable time period of the spatio-temporal patterns of the historical natural disaster events by means of a scaling table classifying the disaster events by intensity and/or year of occurrence, and said distribution of said historical natural disaster events are reproduced by a filtering module within the new spatio-temporal patterns according to their assigned year, wherein a subset of the new spatio-temporal patterns is selected based on geotectonic, topographic or meteorological condition data by their likeliness of occurrence.

6. The method according to claim 1, wherein the footprint record of each measured event parameters is generated based on a definable natural disaster event profile, and a probability is assigned by an interpolation-module to each point in said grid, giving the probability of the occurrence of a specific intensity at a given geographical location and time.

7. The method according to claim 1, wherein the collected historical natural disaster events are filtered by a filter module of the forecast system according to the type of natural disaster event and the signal impulse is generated based upon a selected type of natural disaster event.

8. The method according to claim 1, wherein the footprint records representative of the intensity of the natural disaster event comprise atmospheric or seismic or topographic data associated with at least some of the collected historical natural disaster events, said atmospheric or seismic or topographic data defining an historical footprint record of the historical natural disaster event.

9. The method according to claim 1, wherein the magnitude value for a selected cell in the grid is established from at least one of the footprint record data associated with the selected cell and the footprint record data associated with one or more cells adjacent the selected cell.

10. The method according to claim 1, wherein said dependent sampling process is a directed random walk process.

11. The method according to claim 1, wherein at least some of the plurality of new natural disaster events have starting points that differ from a starting point of the historical natural disaster events upon which the generation of said new natural disaster events is based.

12. The method according to claim 3, wherein for said spatio-temporal pattern one or more footprint records are generated by means of a second MonteCarlo-module, wherein the new footprint records are generated by a MonteCarlo sampling process and wherein the magnitude value of the detected natural disaster event is generated based on the footprint record and the new footprint records.

13. The method according to claim 7, wherein the selectable types of natural disaster events comprise earthquake, inundation, tropical cyclones, volcanic eruptions, and seismic sea waves.

14. The method according to claim 9, wherein the magnitude value for a selected cell is established from a weighed average of footprint record data associated with the selected cell and footprint record data associated with one or more cells adjacent a selected cell.

15. A natural disaster forecast and detection system for automated location dependent natural disaster forecast and disaster impact forecast, comprising located gauging stations to measure location dependent measurement parameters for specific geotectonic, topographic or meteorological conditions associated with the natural disaster or an forthcoming natural disaster, and comprising at least one trigger module to trigger critical values of the measurement parameters and to generate a dedicated event signal for forecasted disaster events and impacts of the disaster event within an area of interest, comprising:

means to collect data of historical disaster events and to generate spatio-temporal patterns representative of the occurrence of said historical natural disaster events;

a calculation unit with a memory module to save said spatio-temporal patterns comprising a plurality of points representative of geographical positions and/or intensity of the event within the area of interest, the calculation unit comprising a data processing unit to determine geotectonic, topographic or meteorological condition data for a geographical area of interest based upon said spatio-temporal patterns, said condition data giving the propagation of a natural disaster event dependent of the distance from a specific excursion point or track dependent on the geotectonic, topographic or meteorological structure along a specific propagation line;

a plurality of located gauging stations with measuring sensors to measure event parameters of an excursion point or track of the disaster event, and transmitting the event parameters to the calculation unit of the forecast system, an occurrence or the forthcoming of an occurrence of a natural disaster within the area of interest being detectable by said located gauging stations and said measured event parameters;

means to generate a footprint record based on the transmitted event parameters and condition data, said footprint record comprising the propagation of the event across the area of interest, the calculation unit comprising means to establish a grid over the geographical area of interest and to generate a magnitude value of the detected natural disaster event based on the footprint record for each grid cell, grid cell comprising a population of a specific population determined by the forecast system;

an interpolation module to generate curve factors of a vulnerability curvature based on said population, said vulnerability curvature setting the affected population in relation to a magnitude of a natural disaster event;

a lookup table with assigned affected population values for each grid cell generated by means of the footprint record giving the affected population by the natural disaster event, a trigger module to generate a signal impulse, if at least one of the affected population factors of the lookup table within a grid cell is triggerable by means of the trigger module to be higher than a definable threshold value; and means to transmit said signal impulse as control signal to one or more alarm systems by the natural disaster forecast system.

* * * * *